United States Patent
Sormani et al.

(10) Patent No.: US 7,169,475 B2
(45) Date of Patent: Jan. 30, 2007

(54) COATING COMPOSITION CONTAINING POLYTRIMETHYLENE ETHER DIOL USEFUL AS A CLEAR COAT COMPOSITION AND AS A PRIMER COMPOSITION

(75) Inventors: Patricia Mary Ellen Sormani, Newark, DE (US); Hari Babu Sunkara, Hockessin, DE (US); James William O'Neil, Chadds Ford, PA (US); Joseph V. Kurian, Hockessin, DE (US); Gia Huynh-Ba, Hockessin, DE (US)

(73) Assignee: E. I. du Pont de Nemours & Company, Wilmington, DE (US)

( * ) Notice: Subject to any disclaimer, the term of this patent is extended or adjusted under 35 U.S.C. 154(b) by 292 days.

(21) Appl. No.: 10/804,259

(22) Filed: Mar. 19, 2004

(65) Prior Publication Data

US 2004/0258923 A1    Dec. 23, 2004

Related U.S. Application Data

(63) Continuation-in-part of application No. 10/393,754, filed on Mar. 21, 2003, now Pat. No. 6,875,514.

(51) Int. Cl.
 *B32B 27/00* (2006.01)
(52) U.S. Cl. .................. 428/423.1; 428/423.3; 427/407.1; 427/409; 528/306; 525/460; 156/94
(58) Field of Classification Search ............. 428/423.1, 428/423.3; 427/407.1, 409; 528/306; 525/460; 156/94
See application file for complete search history.

(56) References Cited

U.S. PATENT DOCUMENTS

| | | | |
|---|---|---|---|
| 4,133,723 A | 1/1979 | Howard | |
| 4,591,533 A | 5/1986 | Antonelli et al. | |
| 4,992,524 A | 2/1991 | Coady et al. | |
| 5,010,140 A | 4/1991 | Antonelli et al. | |
| 5,496,870 A | 3/1996 | Chawla et al. | |
| 5,596,043 A | 1/1997 | Harris et al. | |
| 5,633,362 A | 5/1997 | Nagarajan et al. | |
| 5,686,276 A | 11/1997 | Laffend et al. | |
| 5,763,528 A | 6/1998 | Barsotti et al. | |
| 5,821,092 A | 10/1998 | Nagarajan et al. | |
| 6,210,758 B1 | 4/2001 | McNeil et al. | |
| 6,221,494 B1 | 4/2001 | Barsotti et al. | |
| 6,875,514 B2 * | 4/2005 | Sormani et al. ......... | 428/423.1 |
| 2001/0020049 A1 | 9/2001 | Takase et al. | |
| 2002/0007043 A1 | 1/2002 | Sunkara et al. | |
| 2002/0010374 A1 | 1/2002 | Sunkara et al. | |

FOREIGN PATENT DOCUMENTS

EP    0 443 537 A2    8/1991

OTHER PUBLICATIONS

International Search Report (PCT/US2004/008643) dated Sep. 14, 2004.

* cited by examiner

*Primary Examiner*—Leszek B. Kiliman

(57) ABSTRACT

A coating composition comprising a film forming binder of
 a. an acrylic polymer having pendant groups that are reactive with isocyanate moieties and having a glass transition temperature (Tg) of 10 to 80° C.;
 b. a polytrimethylene ether diol having a Mn (number average molecular weight) of 500 to 5,000; and
 c. an organic polyisocyanate crosslinking agent;
 wherein the coating composition contains pigments and cures at ambient temperatures or elevated temperatures and forms a coating that is sandable and when used in combination with a top coat, for example, a colored base coat and clear coat or a pigmented mono-coat forms a chip resistant multi-layer coating useful for refinishing or repairing automotive and truck bodies and parts the coating composition can be used as an exterior clear coating composition primarily for automobiles, trucks and parts thereof.

10 Claims, No Drawings

COATING COMPOSITION CONTAINING POLYTRIMETHYLENE ETHER DIOL USEFUL AS A CLEAR COAT COMPOSITION AND AS A PRIMER COMPOSITION

CROSS REFERENCE TO RELATED APPLICATIONS

This application is a continuation-in-part application of Ser. No. 10/393,754 filed Mar. 21, 2003 now U.S. Pat. No. 6,875,514.

BACKGROUND OF THE INVENTION

1. Field of the Invention

This invention is directed to a coating composition, in particular, to a coating composition useful as a primer, a primer surfacer or a primer filler having excellent chip resistance and good sandability. Also, this invention is directed to a clear coating composition useful as an exterior top coat applied over a pigmented base coat that has excellent appearance, outdoor weatherability, scuff and mar resistance, and in particular water spot resistance that develops into a hard tack free finish in a relatively short period of time after application to a substrate making the composition particularly useful in the refinishing or repainting of automotive or truck bodies or parts thereof.

2. Description of the Prior Art

To meet the many requirements of an exterior finish for automobiles, the automotive industry currently is using multi-layer finishes on automobile and truck bodies and parts. Typical of these finishes are layers of the following: (1) an electrocoat layer applied over a substrate, typically, a phosphatized cold rolled steel, (2) a primer layer, (3) a colored layer, typically pigmented, and (4) a clear layer. A colored top-coat layer may be used in place of the colored layer and clear layer. On repairing or refinishing such multi-layer finishes, a suitable primer, primer surfacer or primer filler coating is applied over the multi-layer finish that usually is sanded thereby exposing one or more layers or is applied over a filler material that has been used to fill in surface imperfections. This primer, primer surfacer or primer filler, herein after, "primer", has many requirements. It must have adhesion to the substrate and provide a surface to which the colored layer or top-coat will adhere. It must be readily sandable in a reasonably short period of time after application, for example, about three hours after application. It must provide the resulting multi-layer finish with good impact resistance, in particular, stone chip resistance.

For a primer to exhibit the above properties, the cured primer layer should have high flexibility at low temperatures combined with high hardness under low stress conditions. In general, soft primers that have a high degree of flexibility and chip resistance, have poor sandability due to their rubber like nature and hence, cannot be processed rapidly in an auto refinish operation, which results in lowered productivity. If a primer is used that can be readily sanded after a very short drying time, it generally is hard and has poor flexibility and chip resistance. That problem has been partially overcome by using activated base coats to improve the chip resistance of the resulting multi-layer finish. However, this further complicates the refinishing process with the use of another reactive coating that has a limited "pot life".

There are several primer compositions that can be used. For example, Barsotti, et al. U.S. Pat. No. 6,221,494, teaches the use of a solvent based ambient temperature curable high solids urethane coating useful for refinishing automobile and truck bodies and parts. Harris, et al. U.S. Pat. No. 5,596,043 shows a powder coating composition containing urethane and acrylic resins useful for coating that have flexibility and stone chipping resistance and McNeil, et al. U.S. Pat. No. 6,210,758 also shows a coating composition of an acrylic polymer, a polyurethane and a crosslinking agent that has improved chip resistance.

In the refinishing of automobiles and trucks when a clear top coat finish is used, the clear top coat finish must dry to a tack free state after only a short period of time after application, for example, in about 30 minutes or less after application. This allows the vehicle to be moved from the spray area of a typical refinish establishment to another area where additional work can be performed on the vehicle, such as lightly sanding and/or buffing the clear top coat to improve the appearance and remove minor defects. At this stage, the clear top coat has to be cured to a sufficient level to allow for this buffing and/or sanding.

The novel composition of this invention can be readily formulated using conventional techniques to form finishes, in particular primer and clear coat finishes, that cure at low temperatures, preferably, ambient temperatures. This composition provides a primer composition having a combination of early hardness with good sandability. When such a primer is used in combination with a base-coat and clear-coat, a multi-layer finish is formed on an automobile or truck body or part that has good stone chip resistance. When used as a clear coat finish, the novel composition cures to a hard tack free finish in a relatively short period of time and forms a finish that has the required physical properties of exterior durability and weatherability. Also, the novel composition contains components that are derived from renewable resources.

It would be very desirable to have a liquid coating composition, in particular, a primer composition, or a clear coat composition that contains components that are derived from renewable resources and has the desired physical properties for primers and clear coats. The novel composition of this invention in the form of a clear coat or a primer meets these aforementioned requirements.

SUMMARY OF THE INVENTION

A coating composition comprising a film-forming binder of a. an acrylic polymer having pendant groups that are reactive with isocyanate moieties and having a glass transition temperature (Tg) of 10 to 80° C.;

b. a polytrimethylene ether diol having a Mn (number average molecular weight) of 500 to 5,000; and c. an organic polyisocyanate crosslinking agent;

wherein the coating composition forms a clear coating composition or when pigmented, a primer composition and both cure at ambient temperatures or elevated temperatures and the resulting clear coating when properly reinforced with UV (ultraviolet light) stabilizers, quenchers, absorbers and antioxidants forms a weatherable and durable clear finish and when pigmented and used as a primer coating that is sandable and when used in combination with a top coat, for example, a colored base-coat and clear-coat or a pigmented mono-coat, forms a chip resistant multi-layer coating. Both the clear coating and primer coating are useful for refinishing or repainting automotive and truck bodies and parts thereof.

DETAILED DESCRIPTION OF THE INVENTION

The features and advantages of the present invention will be more readily understood, by those of ordinary skill in the art, from reading the following detailed description. It is to be appreciated those certain features of the invention, which are, for clarity, described above and below in the context of separate embodiments, may also be provided in combination in a single embodiment. Conversely, various features of the invention that are, for brevity, described in the context of a single embodiment, may also be provided separately or in any sub-combination. In addition, references in the singular may also include the plural (for example, "a" and "an" may refer to one, or one or more) unless the context specifically states otherwise.

The use of numerical values in the various ranges specified in this application, unless expressly indicated otherwise, are stated as approximations as though the minimum and maximum values within the stated ranges were both preceded by the word "about." In this manner, slight variations above and below the stated ranges can be used to achieve substantially the same results as values within the ranges. Also, the disclosure of these ranges is intended as a continuous range including every value between the minimum and maximum values.

All patents, patent applications and publications referred to herein are incorporated by reference.

The novel coating composition of this invention preferably is a solvent-borne composition containing a film-forming binder of an acrylic polymer that has pendant groups that are reactive with isocyanate moieties and has a glass transition temperature (Tg) of 10 to 80° C.; a polytrimethylene ether diol having a Mn (number average molecular weight) of 500 to 5,000; an organic polyisocyanate crosslinking agent and the composition generally contains pigment(s). The coating composition is particularly useful as a primer used for refinishing or repairing automobile and truck bodies or parts and has a particular advantage that after a relatively short time after application, it is sufficiently hardened and can be sanded. This composition in combination with a topcoat of a color coat and clear coat or a pigmented mono-coat provides a finish that has improved chip resistance in comparison to conventional commercial primers.

The novel coating composition also can be used as a clear coating composition. A "clear coating composition" for automotive use is a composition that forms a transparent finish upon curing and has a DOI (distinctness of image) of more than 70 and a 20° gloss of more than 70. These clear coatings provide a glossy in depth appearance to the finish on the automobile or truck and therefore, are required to have good gloss and distinctness of image. Also, the clear finish provides resistance to weathering, in particular to UV degradation and photo-oxidation when properly reinforced with UV absorbers, quenchers, stabilizers and antioxidants.

The term "binder" as used herein refers to the film forming constituents of the composition that include the acrylic polymer, polytrimethylene ether diol, and organic isocyanate and other reactive oligomers and/or reactive diluents. Solvents, pigments, catalysts, rheology modifiers, antioxidants, UV stabilizers and absorbers, leveling agents, antifoaming agents, anti-cratering agents, adhesion promoting agents are not included in the term.

The binder of the composition contains (a) 10 to 80% by weight, preferably 20 to 70% by weight and more preferably when used as a primer 35 to 55% by weight of the acrylic polymer, (b) 1 to 50% by weight, preferably, 5 to 40% by weight and more preferably when used a primer 20 to 30% by weight of polytrimethylene ether diol and (c) 10 to 50% by weight and preferably 15 to 45% by weight and more preferably when used as a primer 20 to 45% by weight of organic polyisocyanate. All weight percentages are based on the total weight of the binder of the coating composition and the sum of the percentages of (a), (b) and (c) is 100%. Preferably, the novel composition has a molar ratio of NCO:OH of 0.8:1.0 to 1.5:1.0, preferably 0.9:1.0 to 1.1:1.0 and more preferably when used as a primer 1.01:1.0 to 1.1:1.0.

When used as a clear coat the binder contains (a) 60 to 75% by weight of the acrylic polymer, (b) 2.5 to 9.5% by weight of polytrimethylene ether diol and (c) 22 to 31% by weight of organic polyisocyanate. As above, all weight percentages are based on the total weight of the binder of the coating composition and the sum of the percentages of (a), (b) and (c) is 100%. The molar ratio of NCO:OH typically is from 0.6:1.0 to 3.0:1.0 and preferably is greater than or equal to 1.01:1.0.

The acrylic polymer used in the composition has a weight average molecular weight of about 1,000 to 100,000, a Tg of 10 to 80° C. and contains pendant moieties that are reactive with isocyanate groups, such as, hydroxy, amino, amide, glycidyl, silane and carboxyl groups. The Tg can be measured or calculated according to the Fox Equation. Tg of the binder when cured is greater than 30° C. These acrylic polymers can be straight chain polymer, branched polymers, graft polymers, graft terpolymers and core shell polymers.

Preferably, the acrylic polymer has a weight average molecular weight of 5,000 to 50,000, more preferably, 10,000 to 25,000 and still more preferably, of 14,000 to 17,000. The acrylic polymer has a Tg, preferably of greater than 30° C. and up to 80° C. The Tg of the binder when cured is greater than 30° C. Typically useful acrylic polymers are those known in the art and are polymers of the following: linear alkyl (meth)acrylates having 1 to 12 carbon atoms in the alkyl group, cyclic or branched alkyl (meth)acrylates having 3 to 12 carbon atoms in the alkyl group, including isobornyl (meth)acrylate and the polymers can contain styrene, alpha methyl styrene, vinyl toluene, (meth)acrylonitrile, (meth)acryl amides and contain monomers that provide pendant reactive groups, like, hydroxy alkyl (meth)acrylates having 1 to 4 carbon atoms in the alkyl group, glycidyl (meth)acrylate, hydroxy amino alkyl (meth)acrylates having 1 to 4 carbon atoms in the alkyl group, (meth)acrylic acid, alkoxy silyl alkyl (meth)acrylates, such as, trimethoxysilylpropyl (meth)acrylate and the like.

Preferred are hydroxy functional acrylic polymers having a hydroxy equivalent weight (on a solids basis) of 300 to 800, preferably, 380 to 750 and more preferably, 450 to 580 and are polymers of hydroxy alkyl (meth)acrylates and one or more of the aforementioned monomers. The hydroxyl equivalent weight is the grams of resin per equivalent of hydroxyl groups. The following are typically preferred acrylic polymers: styrene/methyl methacrylate/isobutyl methacrylate/hydroxyethyl (meth)acrylate; styrene/methyl methacrylate/isobutyl methacrylate/2-ethylhexyl methacrylate/isobornyl methacrylate/hydroxyethyl (meth)acrylate and styrene/isobornyl methacrylate/2-ethylhexyl methacrylate/hydroxy propyl methacrylate/hydroxyethyl (meth)acrylate.

Suitable hydroxyl-functional unsaturated monomers that are used to introduce hydroxyl groups into the acrylic polymer are, for example, hydroxyalkyl esters of alpha,beta-olefinically unsaturated monocarboxylic acids with primary or secondary hydroxyl groups. These may, for example, comprise the hydroxyalkyl esters of acrylic acid, methacrylic acid, crotonic acid and/or isocrotonic acid. The hydroxyalkyl esters of (meth)acrylic acid are preferred. Examples of suitable hydroxyalkyl esters of alpha,beta-olefinically unsaturated monocarboxylic acids with primary hydroxyl groups are hydroxyethyl (meth)acrylate, hydroxypropyl (meth)acrylate, hydroxybutyl (meth)acrylate, hydroxyamyl (meth)acrylate, hydroxyhexyl (meth)acrylate. Examples of suitable hydroxyalkyl esters with secondary hydroxyl groups are 2-hydroxypropyl (meth)acrylate, 2-hydroxybutyl (meth)acrylate, 3-hydroxybutyl (meth)acrylate.

Additional useful hydroxy-functional unsaturated monomers are reaction products of alpha,beta-unsaturated monocarboxylic acids with glycidyl esters of saturated monocarboxylic acids branched in alpha position, for example with glycidyl esters of saturated alpha-alkylalkanemonocarboxylic acids or alpha,alpha-dialkylalkanemonocarboxylic acids. These preferably comprise the reaction products of (meth)acrylic acid with glycidyl esters of saturated alpha,alpha-dialkylalkanemonocarboxylic acids with 7 to 13 carbon atoms per molecule, particularly preferably with 9 to 11 carbon atoms per molecule. These reaction products may be formed before, during or after the copolymerization reaction.

Further usable hydroxy-functional unsaturated monomers are reaction products of hydroxyalkyl (meth)acrylates with lactones. Hydroxyalkyl (meth)acrylates which may be used are, for example, those stated above. Suitable lactones are, for example, those that have 3 to 15 carbon atoms in the ring, wherein the rings may also comprise different substituents. Preferred lactones are gamma-butyrolactone, delta-valerolactone, epsilon-caprolactone, beta-hydroxy-beta-methyl-delta-valerolactone, lambda-laurolactone or mixtures thereof. Epsilon-caprolactone is particularly preferred. The reaction products preferably comprise those prepared from 1 mole of a hydroxyalkyl ester of an alpha,beta-unsaturated monocarboxylic acid and 1 to 5 moles, preferably on average 2 moles, of a lactone. The hydroxyl groups of the hydroxyalkyl esters may be modified with the lactone before, during or after the copolymerization reaction.

Suitable unsaturated monomers that can be used to provide the acrylic polymer with carboxyl groups are, for example, olefinically unsaturated monocarboxylic acids, such as, for example, acrylic acid, methacrylic acid, crotonic acid, isocrotonic acid, itaconic acid. Acrylic acid and methacrylic acid are preferably used.

Suitable unsaturated monomers that can be used to provide the acrylic polymer with glycidyl groups are, for example, allyl glycidyl ether, 3,4-epoxy-1-vinylcyclohexane, epoxycyclohexyl (meth)acrylate, vinyl glycidyl ether and glycidyl (meth)acrylate. Glycidyl (meth)acrylate is preferably used.

Free-radically polymerizable, olefinically unsaturated monomers which, apart from at least one olefinic double bond, do not contain additional functional groups that can be used to form the acrylic polymer are, for example, esters of unsaturated carboxylic acids with aliphatic monohydric branched or unbranched as well as cyclic alcohols with 1 to 20 carbon atoms. The unsaturated carboxylic acids, which may be considered, are acrylic acid, methacrylic acid, crotonic acid and isocrotonic acid. Esters of (meth)acrylic acid are preferred. Examples of (meth)acrylic acid esters are methyl acrylate, ethyl acrylate, isopropyl acrylate, tert.-butyl acrylate, n-butyl acrylate, isobutyl acrylate, 2-ethylhexyl acrylate, lauryl acrylate, stearyl acrylate and the corresponding methacrylates. Examples of (meth)acrylic acid esters with cyclic alcohols are cyclohexyl acrylate, trimethylcyclohexyl acrylate, 4-tert.-butylcyclohexyl acrylate, isobornyl acrylate and the corresponding methacrylates.

Further useful unsaturated monomers that do not contain additional functional groups are, for example, vinyl ethers, such as, isobutyl vinyl ether and vinyl esters, such as, vinyl acetate, vinyl propionate, vinyl aromatic hydrocarbons, preferably those with 8 to 9 carbon atoms per molecule. Examples of such monomers are styrene, alpha-methylstyrene, chlorostyrenes, 2,5-dimethylstyrene, p-methoxystyrene, vinyl toluene. Styrene is preferably used.

Small proportions of olefinically polyunsaturated monomers may also be used. These are monomers having at least 2 free-radically polymerizable double bonds per molecule. Examples of these are divinylbenzene, 1,4-butanediol diacrylate, 1,6-hexanediol diacrylate, neopentyl glycol dimethacrylate, glycerol dimethacrylate.

The hydroxy-functional (meth)acrylic polymers generally are formed by free-radical copolymerization using conventional processes well known to those skilled in the art, for example, bulk, solution or bead polymerization, in particular by free-radical solution polymerization using free-radical initiators.

Acrylourethanes also can be used to form the novel coating composition of this invention. Typical useful acrylourethanes are formed by reacting the aforementioned acrylic polymers with an organic polyisocyanate. Generally, an excess of the acrylic polymer is used so that the resulting acrylourethane has terminal acrylic segments having reactive groups as described above. These acrylourethanes can have reactive end groups and/or pendant groups such as hydroxyl, carboxyl, amine, glycidyl, amide, silane or mixtures of such groups. Useful organic polyisocyanates are described hereinafter as the crosslinking component but also can be used to form acrylourethanes useful in this invention. Typically useful acrylourethanes are disclosed in Stamegna et al. U.S. Pat. No. 4,659,780, which is hereby incorporated by reference.

The acrylic polymer can contain (meth)acrylamides. Typical examples of such acrylic polymers are polymers of (meth)acrylamide and alkyl (meth)acrylates, hydroxy alkyl (meth)acrylates, (meth)acrylic acid and or one of the aforementioned ethylenically unsaturated polymerizable monomers.

The polytrimethylene ether diol used in the coating composition has a number average molecular weight (Mn) in the range of 500 to 5,000, preferably 1,000 to 3,000. The polytrimethylene ether diol has a Tg of about −75° C., a polydispersity in the range of 1.1 to 2.1 and a hydroxyl number in the range of 20 to 200.

The polytrimethylene ether diol is prepared by an acid-catalyzed polycondensation of 1,3-propanediol, preferably, as described in US. Published Patent Application Numbers 2002/7043 A1 and 2002/10374 A1, both of which are hereby incorporated by reference. The polytrimethylene ether diol also can be prepared by a ring opening polymerization of a cyclic ether, oxetane, as described in J. Polymer Sci., Polymer Chemistry Ed. 28, 449 to 444 (1985) which is also incorporated by reference. The polycondensation of 1,3-propanediol is preferred over the use of oxetane since the diol is a less hazardous, very stable, low cost, commercially available material and can be prepared by use of petro chemical feed-stocks or renewable resources.

Preferably, a bio-route via fermentation of a renewable resource is used to obtain the 1,3-propanediol. One particularly preferred renewable resource is corn since it is readily available and has a high rate of conversion to 1,3-propanediol and can be genetically modified to improve yields to diol. Typical bio-conversion processes are shown in U.S. Pat. Nos. 5, 686,276, 5,633,362 and 5,821,092. US '276 teaches a bio-conversion process of a fermentable carbon source to 1,3-propanediol by a single microorganism. US '362 and US '092 show the bio-conversion of glycerol to 1,3-propanediol by recombinant bacteria harboring a foreign gene encoding a diol dehydratase. The aforementioned patents are incorporated herein by reference.

Copolymers of polytrimethylene ether diol also can be used. For example, such copolymers are prepared by copolymerizing 1,3-propanediol with another diol, such as, ethane diol, hexane diol, 2-methyl-1,3-propanediol, 2,2-dimethyl-1,3-propanediol, trimethylol propane and pentaerythritol. At least 50% of the copolymer must be from 1,3-propanediol.

A blend of a high and low molecular weight polytrimethylene ether diol can be used wherein the high molecular weight diol has an Mn of 1,000 to 4,000 and the low molecular weight diol has an Mn of 150 to 500. The average Mn of the diol should be in the range of 1,000 to 4,000. Also, the diol can contain polytrimethylene ether triols and other higher functionality polytrimethylene ether polyols in an amount of 1 to 20%, by weight, based on the weight of the polytrimethylene ether diol.

Blends of the polytrimethylene ether diol and other cycloaliphatic hydroxyl containing either branched or linear oligomers can be used. Such oligomers are disclosed in Barsotti, et al. U.S. Pat. No. 6,221,494 which is hereby incorporated by reference. Up to 30% by weight, based on the weight of the binder, of polytrimethylene ether glycol can be used.

Coatings formed from compositions of this invention containing polytrimethylene ether diols have a high solvent release rate and result in the coating having high initial hardness and the coating reaches its final state of cure in a shorter time in comparison to coatings prepared from conventional diols, for example, polyester diols. Automotive and truck refinish facilities utilizing the novel composition are able to improve productivity in refinishing and repainting autos and trucks and parts thereof since the resulting coating of the novel composition can be further processed in the facility shortly after application. For example, primer formulations of the novel coating composition having the relatively short cure can be sanded soon after application and surprisingly, have improved adhesion and stone chip resistance. With prior art compositions that did not utilize the polytrimethylene ether diol, rapid cure and sandabililty resulted in a coating with poor chip resistance. To improve chip resistance of these prior art coatings, elastomeric type polymeric materials typically were added but sandability was then significantly reduced. Such is not the case with the novel composition of this invention when properly pigmented and used as a primer.

When used as a clear coating composition, the novel composition containing the necessary weathering additives, cures rapidly and forms a hard finish in a relatively short period after application and can be buffed and lightly sanded. Such clear coating compositions provide for improved productivity in refinish and repair facilities. Also, the resulting coating maintains a better appearance and improved water spot resistance in comparison to coatings formulated with conventional diols.

Typically useful organic polyisocyanate crosslinking agents that can be used in the novel composition of this invention include aliphatic polyisocyanates, cycloaliphatic polyisocyanates, aromatic polyisocyanates and isocyanate adducts.

Examples of suitable aliphatic, cycloaliphatic and aromatic polyisocyanates that can be used include the following: 2,4-toluene diisocyanate, 2,6-toluene diisocyanate ("TDI"), 4,4-diphenylmethane diisocyanate ("MDI"), 4,4'-dicyclohexyl methane diisocyanate, ("H$_{12}$MDI"), 3,3'-dimethyl-4,4'-biphenyl diisocyanate ("TODI"), 1,4-benzene diisocyanate, trans-cyclohexane-1,4-diisocyanate, 1,5-naphthalene diisocyanate ("NDI"), 1,6-hexamethylene diisocyanate ("HDI"), 4,6-xylene diisocyanate, isophorone diisocyanate, ("IPDI"), other aliphatic or cycloaliphatic di-, tri- or tetra-isocyanates, such as, 1,2-propylene diisocyanate, tetramethylene diisocyanate, 2,3-butylene diisocyanate, octamethylene diisocyanate, 2,2,4-trimethyl hexamethylene diisocyanate, dodecamethylene diisocyanate, omega-dipropyl ether diisocyanate, 1,3-cyclopentane diisocyanate, 1,2-cyclohexane diisocyanate, 1,4-cyclohexane diisocyanate, 4-methyl-1,3-diisocyanatocyclohexane, dicyclohexylmethane-4,4'-diisocyanate, 3,3'-dimethyl-dicyclohexylmethane 4,4'-diisocyanate, polyisocyanates having isocyanurate structural units, such as, the isocyanurate of hexamethylene diisocyanate and the isocyanurate of isophorone diisocyanate, the adduct of 2 molecules of a diisocyanate, such as, hexamethylene diisocyanate, uretidiones of hexamethylene diisocyanate, uretidiones of isophorone diisocyanate and a diol, such as, ethylene glycol, the adduct of 3 molecules of hexamethylene diisocyanate and 1 molecule of water, allophanates, trimers and biurets, for example, of hexamethylene diisocyanate, allophanates, trimers and biurets, for example, of isophorone diisocyanate and the isocyanurate of hexane diisocyanate. MDI, HDI, TDI and isophorone diisocyanate are preferred because of their commercial availability.

Tri-functional isocyanates also can be used, such as, triphenyl methane triisocyanate, 1,3,5-benzene triisocyanate, 2,4,6-toluene triisocyanate. Trimers of diisocyanates, such as, the trimer of hexamethylene diisocyanate, sold as Tolonate® HDT from Rhodia Corporation and the trimer of isophorone diisocyanate are also suitable.

An isocyanate functional adduct can be used, such as, an adduct of an aliphatic polyisocyanate and a polyol or an adduct of an aliphatic polyisocyanate and an amine. Also, any of the aforementioned polyisocyanates can be used with a polyol to form an adduct. Polyols, such as, trimethylol alkanes, particularly, trimethylol propane or ethane can be used to form an adduct.

The novel composition optionally contains an aminofunctional silane crosslinking agent or curing agent usually in an amount of 0.1 to 20% by weight, based on the weight of the binder; preferably, 0.5 to 3.5% by weight, based on the weight of the binder, of silane is used. Typically useful aminofunctional silanes have the formula

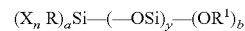

wherein X is selected from the group of —NH$_2$, —NHR$^2$, and SH, n is an integer from 1 to 5, R is a hydrocarbon group contain 1 to 22 carbon atoms, R$^1$ is an alkyl group containing 1 to 8 carbon atoms, a is at least 1, y is from 0 to 20, b is at least 2 and R$^2$ is an alkyl group having 1 to 4 carbon atoms.

Typically useful aminofunctional silanes are aminomethyltriethoxysilane, gamma-aminopropyltrimethoxysilane, gamma-aminopropyltriethoxysilane, gamma-aminopropylmethyldiethoxysilane, gamma-aminopropylethyldiethoxysilane, gamma-aminopropylphenyldiethoxyysilane, N-beta (aminoethyl)gamma-aminopropyltrimethoxysilane, delta-aminobutyltriethoxysilane, delta-aminobutylethyldiethoxysilane and diethylene triamino propylaminotrimethoxysilane. Preferred are N-beta(amino-ethyl)gamma-aminopropyltrimethoxysilane, commercially sold as Silquest® A 1120, and diethylene triamino propylaminotrimethoxysilane that is commercially sold as Silquest® A 1130. Both of theses silanes are sold by OSi Specialties, Inc. Danbury, Conn.

When an amino silane crosslinking agent is used, additional amino functional curing agents, such as, primary, secondary and tertiary amines, that are well known in the art, are usually added. Typically, aliphatic amines containing a primary amine group, such as, diethylene triamine, and triethylene tetramine can be added. Tertiary amines, such as, tris-(dimethyl aminomethyl)-phenol can also be used.

When utilized as a pigmented primer composition, the novel composition can contain 1 to 50% by weight, preferably, 20 to 40% by weight, based on the weight of the binder, of acrylic NAD (non-aqueous dispersed) resins. These NAD resins typically are high molecular weight resins having a crosslinked acrylic core with a Tg between 20 to 100° C. and attached to the core are low Tg stabilizer segments. A description of such NAD resins is in Antonelli et al. U.S. Pat. No. 4,591,533, Antonelli et al. U.S. Pat. No. 5,010,140 and in Barsotti et al. U.S. Pat. No. 5,763,528. These patents are hereby incorporated by reference. Clear coating compositions generally do not contain NAD resins since such resins tend to reduce the clarity of the clear layer.

Typically, a catalyst is used in the novel composition to reduce curing time and temperature and allow curing of the coating at ambient temperatures. Typical catalysts include dibutyl tin dilaurate, dibutyl tin diacetate, dibutyl tin dichloride, dibutyl tin dibromide, triphenyl boron, tetraisopropyl titanate, triethanolamine titanate chelate, dibutyl tin dioxide, dibutyl tin dioctoate, tin octoate, aluminum titanate, aluminum chelates, zirconium chelate, hydrocarbon phosphonium halides, such as, ethyl triphenyl phosphonium iodide and other such phosphonium salts, and other catalysts or mixtures thereof known to those skilled in the art.

The novel composition typically is solvent based and can contain up to 95% by weight, based on the weight of the composition, of solvent. Typically, the novel composition has a solids content of 20 to 80% by weight, preferably, 50 to 80% by weight and more preferably, 60 to 80% by weight of a ready to spray composition. The novel composition may be formulated at 100% solids by using a low molecular weight acrylic resin reactive diluent.

If the novel composition is utilized as a typical primer, the solids are 70–75% by weight and ready to spray primers typically have a solids level of 60–65% by weight. When utilized as a sealer, the solids are 20–75% by weight. When used as a clear coat, the clear coats typically can have a wide solids range of 5–100% by weight, but preferably are used in the range of 25–85% by weight and more preferably at 35–65% by weight.

Any of the typical organic solvents may be used to form the coating composition. Such solvents include aromatic hydrocarbons, such as, toluene, xylene; ketones, such as, acetone, methyl ethyl ketone, methyl isobutyl ketone, methyl amyl ketone and diisobutyl ketone; esters, such as, ethyl acetate, n-butyl acetate, isobutyl acetate and mixtures of any of the above.

An advantage of the novel coating composition of this invention is that it has a low VOC (volatile organic content) and can readily be formulated to have a VOC of less than 334 g/l (2.8 pounds per gallon) and in particular can be formulated to a VOC less than 240 g/l (2 pound per gallon) that meets current governmental air pollution regulations.

Typically, when the novel composition is utilized as a pigmented composition, it contains pigments in a pigment to binder weight ratio of 1/100 to 350/100. When the composition is used as a primer, conventional primer pigments are used in a pigment to binder weight ratio of 150/100 to 350/100. Typical of such pigments that are useful in primers are titanium dioxide, zinc phosphate, iron oxide, carbon black, amorphous silica, high surface area silica, barium sulfate, talc, chromate pigments for corrosion resistance, such as, calcium chromate, strontium chromate, zinc chromate, magnesium chromate, barium chromate and hollow glass spheres. If the coating composition is used as a base-coat or top-coat coating composition, inorganic and organic colored pigments, metallic flakes and powders, such as, aluminum flake and aluminum powders; special effects pigments, such as, coated mica flakes, coated aluminum flakes colored pigments may be used usually in combination with one of the aforementioned pigments.

When used as an exterior clear coating composition the novel composition can contain transparent pigments or pigments having the same refractive index as the cured binder in a pigment to binder weight ratio of 0.1/100 to 5/100. One such pigment is silica.

If the novel coating composition is to be used as an exterior clear coating or as a coating that is subject to weathering and/or exposure to UV light, weatherability and UV durability properties of the coating are improved by the addition of ultraviolet light stabilizers, or a combination of ultraviolet light stabilizers in the amount of 0.1% to 10% by weight, based on the weight of the binder. Such stabilizers include ultraviolet light absorbers, screeners, quenchers, and specified hindered amine light stabilizers. An antioxidant also can be added, in the amount of 0.1% to 5% by weight, based on the weight of the binder.

Typical ultraviolet light stabilizers that are useful include benzophenones, triazoles, triazines, benzoates, hindered amines and mixtures thereof. Specific examples of ultraviolet stabilizers are disclosed in Antonelli et al. U.S. Pat. No. 4,591,533, the entire disclosure of which is incorporated herein by reference. For good durability, a blend of Tinuvin® 328 and Tinuvin®123 (hindered amine light stabilizers), all commercially available from Ciba Specialty Chemicals, Tarrytown, N.Y. is preferred.

Typically useful ultraviolet light absorbers include hydroxyphenyl benzotriazoles, such as, 2-(2-hydroxy-5-methylphenyl)-2H-benzotrazole, 2-(2-hydroxy-3,5-di-ter-t.amyl-phenyl)-2H-benzotriazole, 2[2-hydroxy-3,5-di(1,1-dimethylbenzyl)phenyl]-2H-benzotriazole, reaction product of 2-(2-hydroxy-3-tert.butyl-5-methyl propionate)-2H-benzotriazole and polyethylene ether glycol having a weight average molecular weight of 300, 2-(2-hydroxy-3-tert.butyl-5-iso-octyl propionate)-2H-benzotriazole; hydroxyphenyl s-triazines, such as, 2-[4((2,-hydroxy-3-dodecyloxy/tridecyloxypropyl)-oxy)-2-hydroxyphenyl]-4,6-bis(2,4-dimethylphenyl)-1,3,5-triazine, 2-[4(2-hydroxy-3-(2-ethylhexyl)-oxy)-2-hydroxyphenyl]4,6-bis(2,4-dimethylphenyl)1,3,5-triazine, 2-(4-octyloxy-2-hydroxyphenyl)-4,6-bis(2,4-dimethylphenyl)-1,3,5-triazine; hydroxybenzophenone U.V. absorbers, such as, 2,4-dihydroxybenzophenone, 2-hydroxy4-octyloxybenzophenone, and 2-hydroxy-4-dodecyloxybenzophenone.

Typically useful antioxidants include tetrakis[methylene (3,5-di-tert-butylhydroxy hydrocinnamate)]methane, octadecyl 3,5-di-tert-butyl-4-hydroxyhydrocinnamate, tris(2,4- di-tert-butylphenyl) phosphite, 1,3,5-tris(3,5-di-tert-butyl4-hydroxybenzyl)-1,3,5-triazine-2,4,6(1H,3H,5H)-trione and benzenepropanoic acid, 3,5-bis(1,1-dimethyl-ethyl)-4-hydroxy-$C_7$-$C_9$ branched alkyl esters. Typically useful hydroperoxide decomposers include Sanko® HCA (9,10-dihydro-9-oxa-10-phosphenanthrene-10-oxide), triphenyl phosphate and other organo-phosphorous compounds, such as, Irgafos® TNPP from Ciba Specialty Chemicals, Irgafos® 168, from Ciba Specialty Chemicals, Ultranox® 626 from GE Specialty Chemicals, Mark PEP-6 from Asahi Denka, Mark HP-10 from Asahi Denka, Irgafos® P-EPQ from Ciba Specialty Chemicals, Ethanox 398 from Albemarle, Weston 618 from GE Specialty Chemicals, Irgafos® 12 from Ciba Specialty Chemicals, Irgafos® 38 from Ciba Specialty Chemicals, Ultranox® 641 from GE Specialty Chemicals and Doverphos® S-9228 from Dover Chemicals.

Typically useful hindered amine light stabilizers include N-(1,2,2,6,6-pentamethyl-4-piperidinyl)-2-dodecyl succinimide, N(1 acetyl-2,2,6,6-tetramethyl-4-piperidinyl)-2-dodecyl succinimide, N-(2hydroxyethyl)-2,6,6,6-tetramethylpiperidine-4-ol-succinic acid copolymer, 1,3,5 triazine-2,4,6-triamine, N,N'''-[1,2-ethanediybis[[[4,6-bis[butyl(1,2,2,6,6-pentamethyl-4-piperidinyl)amino]-1,3,5-triazine-2-yl]imino]-3,1-propanediyl]]bis[N,N'''-dibutyl-N',N'''-bis(1,2,2,6,6-pentamethyl-4-piperidinyl)], poly-[[6-[1,1,3,3-tetramethylbutyl)-amino]-1,3,5-trianzine-2,4-diyl][2,2,6,6-tetramethylpiperidinyl)-imino]-1,6-hexane-diyl[(2,2,6,6-tetramethyl-4-piperidinyl]imino]), bis(2,2,6,6-tetramethyl-4-piperidinyl)sebacate, bis(1,2,2,6,6-pentamethyl-4-piperidinyl)sebacate, bis(1-octyloxy-2,2,6,6-tetramethyl4-piperidinyl)sebacate, bis(1,2,2,6,6-pentamethyl4-piperidinyl)[3,5bis(1,1-dimethylethyl4-hydroxy-phenyl)methyl]butyl propanedioate, 8-acetyl-3-dodecyl-7,7,9,9,-tetramethyl-1,3,8-triazaspiro(4,5)decane-2,4-dione, dodecyl/tetradecyl-3-(2,2,4,4-tetramethyl-21-oxo-7-oxa-3, 20-diazal dispiro(5.1.11.2)henicosan-20-yl)propionate.

The coating compositions may contain conventional coating additives. Examples of such additives are leveling agents based on (meth)acrylic homopolymers, rheological agents, such as highly disperse silica or polymeric urea compounds, thickeners, such as partially cross-linked polycarboxylic acid or polyurethanes, antifoaming agents, wetting agents, catalysts for the cross-linking reaction of the OH-functional binders, for example, organic metal salts, such as, dibutyltin dilaurate, zinc naphthenate and compounds containing tertiary amino groups, such as, triethylamine, for the cross-linking reaction with polyisocyanates. The additives are used in conventional amounts familiar to the person skilled in the art.

The novel coating composition may also contain other conventional formulation additives, such as, wetting agents, leveling and flow control agents, for example, Resiflow®S (polybutylacrylate), BYK® 320 and 325 (high molecular weight polyacrylates), BYK® 347 (polyether-modified siloxane) and rheology control agents, such as, fumed silica.

In addition to component a., the coating compositions according to the invention may contain further reactive low molecular weight compounds as reactive diluents that are capable of reacting with the cross-linking component c. For example, low molecular weight polyhydroxyl compounds, such as, ethylene glycol, propylene glycol, trimethylolpropane and 1,6-dihydroxyhexane may be used.

Depending upon the type of cross-linking agent (component c.), the novel composition may be formulated as single-component or two-component coating compositions. If polyisocyanates with free isocyanate groups are used as the cross-linking agent, the coating compositions are two-component systems, i.e. components a. and b. may be mixed with the polyisocyanate component only shortly before application. If blocked polyisocyanates and/or amino resins are, for example, used as the cross-linking agent, the coating compositions may be formulated as a single component composition. The coating compositions may, in principle, additionally be adjusted to spray viscosity with organic solvents before being applied.

In a typical two component composition, the two components are mixed together shortly before application. The first component contains the acrylic polymer having pendant reactive groups, such as, an acrylic polymer having reactive hydroxyl groups, and the polytrimethylene ether diol and any transparent pigments. The pigments can be dispersed in the first component using conventional dispersing techniques, such as, ball milling, sand milling, attritor grinding, and the like. The second component contains the crosslinking agent, such as, a polyisocyanate crosslinking agent, and an optional amino functional silane crosslinking agent and an optional additional amine curing agent and solvents.

The coating compositions according to the invention are suitable for vehicle and industrial coating and may be applied by using known processes, in particular spray application. In the context of vehicle coating, the coating compositions may be used both for vehicle original coating and for repair or refinish coating of vehicles and vehicle parts. Since the coating composition contains an organic polyisocyanate crosslinking agent, curing of the composition can be accomplished at ambient temperatures but the composition also can be force dried at elevated temperatures of 50 to 150° C. Typical elevated curing temperatures of 20° C. to 80° C., in particular of 20 to 60° C., are used for vehicle repair or refinish coatings.

The coating composition can be applied by conventional techniques, such as, spraying, electrostatic spraying, dipping, brushing, and flow coating. Typically, the coating is applied to a dry film thickness of 20 to 300 microns and preferably, 50 to 200 microns, and more preferably, 50 to 130 microns. The coating can be cured at ambient temperatures and can be force cured at elevated temperatures of 50 to 150° C. to decrease the curing time.

Cured clear films (non-pigment containing films) of the novel coating composition have excellent elastic and hardness properties and the Tg of the cured film is greater than 45° C. which is surprising since the diol used in the composition has a Tg of −75° C. While not wishing to be bound by a theory, it is believed the acrylic polymer provides the hardness to the coating while the polytrimethylene ether diol segment provides improved flexibility and thus provides a coating with improved chip resistance and desired hardness.

The coating composition of this invention forms finishes having a high excellent flexibility, good adhesion to the substrates, can easily be buffed or sanded in a short time after application. In particular, the coating composition has a good cure response at ambient temperatures and excellent cure response at elevated temperature curing conditions.

When pigmented and formulated into a primer and cured, the composition forms primer finishes having excellent flexibility, good adhesion to the original finish which may be sanded or to which a wash primer (thin primer layer) applied over the original finish, provides good filling of surface imperfections, can easily be sanded in a short time after application and curing and provides excellent stone chip resistance. In particular, the coating composition has a good cure response at ambient temperatures and excellent cure response at elevated temperature curing conditions.

The present invention is further defined in the following Examples. It should be understood that these Examples are given by way of illustration only. From the above discussion and these Examples, one skilled in the art can ascertain the essential characteristics of this invention, and without departing from the spirit and scope thereof, can make various changes and modifications of the invention to adapt it to various uses and conditions. As a result, the present invention is not limited by the illustrative examples set forth herein below, but rather is defined by the claims contained herein below.

Testing Procedures used in the Examples

Dry Film Thickness—test method ASTM D4138

Zahn Viscosity—determined using a #1 Zahn cup according to ASTM D 1084 Method D.

Persoz Hardness Test—the change in film hardness of the coating was measured with respect to time after application by using a Persoz Hardness Tester Model No. 5854 [ASTM D4366] supplied by Byk-Mallinckrodt, Wallingford, Conn. The number of Oscillations [referred as Persoz No.] are recorded.

Fischer Hardness—was measured using a Fischerscope® Hardness Tester. [The measurement is in Newtons per square millimeter.]

Tg (glass transition temperature) of a polymer is determined according to ASTM D-3418 (1988) or calculated according to the Fox Equation.

Molecular weight and hydroxyl number of the polytrimethylene ether diol are determined according to ASTM E222.

Molecular weights Mw and Mn and the polydispersity (Mw/Mn) of the acrylic polymer and other polymers are determined by GPC (Gel Permeation Chromatography) using polystyrene standards and tetrahydrofuran as the solvent.

Water Spot Test—This test measures how well the film is crosslinked early in the curing of the film. Water spot damage of the film indicates that the curing of the film is not complete and further curing is required before the film can be wet sanded or buffed. The following procedure is used:

Panels are coated with the coating composition and then allowed to cure either under ambient temperature conditions or elevated temperature conditions for a set period of time. The panels are laid on a flat surface and deionized water is applied with a pipette at 1 hour timed intervals. A drop of water about ½ inch (1.27 cm) in diameter is applied and allowed to evaporate over a given time period, typically, 60 minutes and 120 minutes, and the water spot on the panel is checked for deformation and discoloration. The panels are lightly wiped with a cheese cloth wetted with deionized water and was followed by lightly wiping the panels dry with cheese cloth. The panels are rated on a scale of 1 to 10 using the following ratings:

10—best, no evidence of spotting, distortion or discoloration.

9—spotting barely detectable.

8—slight ring visible.

7—very slight to slight discoloration.

6—slight loss of gloss or discoloration.

5—definite loss of gloss or discoloration.

4—slight etching or definite distortion.

3—light lifting of the coating, bad etching or discoloration.

2—definite lifting of the coating.

1—coating dissolved.

Gravelometer—similar to test method ASTM D3170. A 90 degree panel angle is used, with panels and stones conditioned in a freezer held at −26° C. to −36° C. for a minimum of 2 hours prior to testing. One pint of such frozen stones is used in the test. Additionally, 3 pints of room-temperature stones are used on panels stored at room temperature to provide additional information. Panels are rated from 1 to 9 with 1 being the worst (very severe chipping) and 9 being the best (almost no chipping). Optionally, the area (in square millimeters) of the largest chip is also considered in assessing the performance of the coating.

Percent strain to break and energy to break—were obtained on a Model 1122 Instron electromechanical test machine modified for computer control and data reduction and maintained according the standards of ISO 9001. Test sample width was 12.7 mm and thickness was approximately 0.1 mm; the exact thickness was determined with a calibrated micrometer. The gage length was 12.7 mm and test speed was 5.0 mm/min. All results were obtained under ambient laboratory conditions.

In the following examples, all parts and percentages are on a weight basis unless otherwise indicated. "Mw" weight average molecular weight and "Mn" means number average molecular weight. "PBW" means parts by weight.

EXAMPLES

Example 1

Preparation of (Polytrimethylene Ether Diols A and B)

1,3-Propanediol (3.4 kg) and concentrated sulfuric acid (30.4 g) were placed in a 5 L three neck round bottom flask fitted with a nitrogen inlet, mechanical stirrer and a distillation head. Nitrogen gas was bubbled through the reaction mixture for 15 minutes. The polymerization was carried out at 160° C. with stirring under a nitrogen atmosphere. After collecting 525 g of water distillate in a receiving flask, the flask was connected to a vacuum pump and the pressure was slowly reduced to 1–5 mm Hg. The molecular weight of the resulting reaction product was monitored by analyzing the samples at different time intervals using an NMR end group analysis method. The polymerization was stopped after obtaining the desired molecular weight (approximately 2,000) and the polymer was purified as described below.

An equal volume of water was added to the crude polymer and the reaction mixture was refluxed at 100° C. for about 6 hours and a stirring speed of 180 rpm was used under a nitrogen atmosphere. After approximately 6 hours, the heater and the stirrer were turned off and the mixture was allowed to separate into two phases. The top aqueous phase was decanted and the polytrimethylene ether diol phase was washed further with distilled water three more times to extract out most of the acid and the oligomers that were formed. The residual acid left in the polytrimethylene ether diol was neutralized with excess lime. The polytrimethylene ether diol was dried at about 100° C. under reduced pressure for 2–3 hours and then the dried diol was filtered while hot through a Whatman filter paper pre-coated with a Celite® filter aid. The polytrimethylene ether diol was analyzed and the properties are listed in Table 1 below. A second polytrimethylene ether diol B was prepared as above and the properties are shown in Table 1.

TABLE 1

Properties of polytrimethylene ether diols A and B

|  | Polytrimethylene ether diol | |
|---|---|---|
|  | A | B |
| Number Average Molecular Weight (Mn) | 1850 | 2738 |
| Hydroxyl Number | 60.6 | 41.0 |

Preparation of Primer Millbase Compositions A–C

Primer millbase compositions A, B, and C were prepared by charging the following ingredients into a mixing vessel:

|  | Primer Millbase Compositions | | |
|---|---|---|---|
| Description of Material | A PBW | B PBW | C PBW |
| Portion 1 |  |  |  |
| Butyl acetate | 130.90 | 84.38 | 52.17 |
| Xylene | 21.30 | 21.81 | 22.21 |
| Methyl amyl ketone | 23.20 | 23.81 | 24.25 |
| Methyl isobutyl ketone | 75.30 | 77.09 | 78.50 |
| Polytrimethylene ether diol B Mn 2738 (prepared above) | 75.70 | 38.75 | — |
| Ethylene oxide oligomer[1] | 0.0 | 48.44 | 98.64 |
| Hydroxy acrylic polymer[2] | 295.20 | 305.97 | — |
| Hydroxy acrylic polymer[3] | — | — | 307.9 |
| BYK-320 dispersion (Polysiloxane resin available from Byk Chemie) | 3.80 | 3.88 | 3.95 |
| Anti-Terra U (salt of a long chain polyamine-amide and high molecular weight ester) | 2.80 | 2.82 | 2.87 |
| Dibutyl tin diacetate (10% solution in xylene) | 1.70 | 1.89 | 2.07 |
| Bentone ®-34 (dispersion of Bentone ® 34 from Elementis Specialties) | 76.60 | 78.44 | 79.87 |
| Portion 2 |  |  |  |
| Talc N 503 (talc pigment) | 91.60 | 93.79 | 95.50 |
| Talc D30E (talc pigment) | 134.90 | 138.21 | 140.73 |
| ZEEOS G 200 (hollow glass beads from Eastech Chemical) | 337.40 | 345.57 | 351.88 |
| Portion 3 |  |  |  |
| Blanc Fixe (barium sulfate pigment) | 119.90 | 122.75 | 124.99 |
| Titanium dioxide pigment | 106.10 | 108.70 | 110.69 |
| Carbon black pigment | 2.30 | 2.34 | 2.38 |
| Portion 4 |  |  |  |
| Acetic acid | 1.30 | 1.38 | 1.40 |
| Total | 1500.00 | 1500.00 | 1500.00 |

Ethylene oxide oligomer[1]-reaction product of 1 mole of pentaerythritol, 4 moles of methyl hexahydrophthalic anhydride and 4 moles of ethylene oxide.
Hydroxy acrylic polymer[2]-acrylic polymer of 37 parts styrene, 17.5 parts isobornyl methacrylate, 25.5 parts hydroxyethyl methacrylate, 20 parts 2-ethylhexyl methacrylate having a Mw of 15,000 and a Tg of 68° C.
Hydroxy acrylic polymer[3]-acrylic polymer of 37 parts styrene, 23 parts hydroxyethyl acrylate, 40 parts 2-ethylhexyl methacrylate having a Mw of 15,000 and a Tg of 20° C.

In the preparation of each of the Primer Millbase Compositions A, B and C, Portion 1 was charged into the mixing vessel and stirred for 15 minutes. Portion 2 was premixed and slowly added to the mixing vessel with stirring and stirred for 30 minutes. Portion 3 was premixed and slowly added to the mixing vessel with stirring and stirred for 60 minutes. Portion 4 was added and stirred for 15 minutes and the resulting mixture was ground 3 passes in a top feed sand mill using glass media for 3 passes. Since Primer Millbase Composition C does not contain polytrimethylene ether diol, it is considered to be a comparative composition.

The resulting Primer Millbases A to C have the following properties:

|  | Primer Millbase | | |
|---|---|---|---|
|  | A | B | C |
| Weight % solids | 70.2 | 72.0 | 73.4 |
| Volume % solids | 49.8 | 51.6 | 53.3 |
| Pigment/Binder ratio | 312.85/100 | 310.3/100 | 310.3/100 |
| Pigment Vol. Concentration (%) | 53.7 | 54.2 | 54.0 |
| Gallon Weight (#/gal) | 12.09 | 12.36 | 12.49 |

Activated Primer Compositions A to C were prepared by blending the following ingredients together shortly before spray application:

|  | Activated Primer Comp. | | |
|---|---|---|---|
|  | A | B | C |
| Primer Mill Base | 166.40 | 161.95 | 157.69 |
| Reducer[3] | 18.80 | 18.32 | 17.84 |
| Activator[4] | 14.80 | 19.73 | 24.46 |
| Total | 200.00 | 200.00 | 200.00 |

Reducer[3]-12375S-blend of oxygenated hydrocarbon solvents commercially available from E. I. DuPont de Nemours and Company, Wilmington, Delaware (hereinafter "DuPont").
Activator[4]-12305S-65% solids in a mixture of ketones, esters and hydrocarbon solvents of Tolonate ® HDT trimer of hexamethylene diisocyanate (Rhodia Inc.) activator and is commercially available from DuPont.

The resulting Activated Primer Compositions A to C have the following properties:

|  | Activated Primer Comp. | | |
|---|---|---|---|
|  | A | B | C |
| NCO:OH ratio | 1.12:1.0 | 1.12:1.0 | 1.12:1.0 |
| Weight % solids | 62.92 | 64.43 | 65.50 |
| Volume % solids | 43.21 | 44.95 | 46.46 |
| Gallon Weight (#/gal) | 11.02 | 11.11 | 11.10 |
| VOC* (calculated #/gal) | 4.09 | 3.94 | 3.82 |

VOC volatile organic content.

The above prepared Activated Primer Compositions A to C were each applied by spraying onto separate cold rolled steel panels coated with about 0.3 to 0.6 mils (7.5 to 15 microns) of a commercial refinish wash primer (described below) and the Activated Primer Composition was cured at ambient temperature. After curing, the resulting dry film thickness of the primer composition was in the range of 4 to 7 mils (100 to 178 microns). The Persoz Hardness and the Fischer Hardness were measured for each of the panels and shown in Tables 2 and 3 below. Primer C panels were retested (Primer C did not contain the polytrimethylene ether diol).

TABLE 2

Persoz Hardness of Activated Primer Compositions A to C

| Primer | 3 Hours | 1 Day |
|---|---|---|
| A | 30 | 66 |
| B | 30 | 51 |
| C | 34 | 37 |
| C (retest) | 34 | 36 |

TABLE 3

Fischer Hardness of Activated Primer Compositions A to C

| Primer | 1 day | 7 days | 18 days | 21 days |
|---|---|---|---|---|
| A | 48 | 126 | 97 | 106 |
| B | 27 | 84 | 110 | 133 |
| C | 21 | 51 | 59 | 60 |
| C (retest) | 23 | 46 | 64 | 64 |

The above data in Tables 2 and 3 shows that Primer Compositions A and B that contained the polytrimethylene ether diol increased in hardness on curing whereas Primer Composition C, which did not contain the polytrimethylene ether diol, did not increase significantly in hardness on curing. Table 2 containing the Persoz Hardness data, shows that the Persoz Hardness approximately doubled from 3 hours to 24 hours after application for Primer Compositions A and B whereas the Persoz Hardness for Primer C only increased slightly. Table 3 containing Fischer Hardness data, shows that the hardness of Primer Compositions A and B is nearly double that of Primer Composition C after 18 and 21 days. Due to the similar hardness values at short times, sandability is expected to be similar for Primer Compositions A to C.

The commercial refinish wash primer utilized to prime the above steel panels is formulated by mixing Variprime® 615S (pigmented component) and Variprime® D 616S (reducer component) in a 1/1 volume ratio (weight ratio of 120 g of 615S/80 g of 616S) to form a composition having a total solids content of 28.43%, binder solids of 8.39%, pigment to binder weight ratio of 239/100, VOC (#/gal) 5.891 and a gallon weight (#/gal) of 5.42. The binder of the primer is a combination of phenolic/polyvinyl butyral/nitrocellulose resin. The pigment portion of 615S contains zinc chromate pigment in the amount of 5.3% on the total formula composition by weight. The reducer (616S) contains phosphoric acid in the amount of 2.2% by weight based the total formula weight. 615S and 616S are commercial products available from DuPont.

A set of panels primed with Primer Compositions A to C was prepared as above. The panels were allowed to cure overnight at about 24° C. and 50% relative humidity, and were then sanded with 400 grit sandpaper to give a film build of about 4.0 to 4.5 mils (102 to 114 microns). Each of the panels was coated with an un-activated blue metallic base coat—ChromaBase® Blue Metallic basecoat N 8112K (hydroxy functional acrylic polymer dispersion containing dispersed aluminum flake pigments, phthalocyanine blue pigment and carbon black pigment) and Chromasystems Basemaker 7175S (acrylic resin in organic solvents—available from DuPont. One part of N8112K is mixed with one part 7175S to form an unactivated base coat. Each panel was top coated with a clear top coat (DuPont ChromaClear® V-7500S two component urethane clear coat commercially available from DuPont.

Another panel was prepared as above with Primer Composition C and the blue metallic base coat was activated with ChromaPremier® 12305S isocyanate activator.

A second set of panels coated with Primer Composition A to C and prepared as described above was coated with an unactivated red base coat—ChromaBase® Red Basecoat B8713K (hydroxyfunctional acrylic polymer dispersion containing Monastral® Magenta pigment dispersion and Perrindo® red dispersion) and Chromasystems Basemaker 7175S (acrylic resin in organic solvents). One part of B8731 K was mixed with one part of 7175 S. Each of the panel was coated with a clear top-coat (described above).

Another panel was prepared as above with Primer Composition C except the base coat was activated with the ChromaPremier® 12305S isocyanate activator.

Each of the above prepared sets of panels was tested for chip resistance using the Gravelometer test as described above. The results are shown in Table 4 below.

TABLE 4

Gravelometer Test Results

| Gravelometer Test | 3 Pints Stones Room Temp. | 1 Pint Stones Frozen |
|---|---|---|
| Blue Metallic Base Coat | | |
| Primer A | 5 | 7 |
| Primer B | 3 | 5 |
| Primer C | 3 | 4 |
| Primer C with Activated Base Coat | 5 | 7 |
| Red Base Coat | | |
| Primer A | 5 | 6 |
| Primer B | 3 | 4 |
| Primer C | 1 | 2 |
| Primer C with Activated Base Coat | 6 | 6 |

The above data shows that for both the panels of the Blue Metallic Base Coat and the Red Base Coat, Primers A and B that contained polytrimethylene ether diol have a higher Gravelometer chip rating at room temperature and at a low temperature in comparison to Primer C that did not contain polytrimethylene ether diol. In both cases, the blue metallic and the red activated base coats in combination with Primer C did not significantly increase the chip resistance in comparison to Primer A that contained the polytrimethylene ether diol. Normally, an activated base coat increases chip resistance. Primer B shows some improvement as compared to Primer C used with an un-activated basecoat. Primer A that contained the polytrimethylene ether diol had the best performance with the un-activated base coat, either the red or blue metallic. This shows that the addition of polytrimethylene ether diol in combination with an ethylene oxide oligomer improves chip performance in comparison to the use of only ethylene oxide oligomer in Primer C. Use of polytrimethylene ether diol in place of an ethylene oxide oligomer results in the best performance.

Example 2

The following clear coating compositions D, E, and F were prepared by charging the following ingredients into a mixing vessel and thoroughly mixing the ingredients:

|  | Clear Coating Compositions | | |
|---|---|---|---|
| Description of Material | D PBW | E PBW | F PBW |
| Hydroxy acrylic polymer[3] | — | — | 90.0 |
| Hydroxy acrylic polymer[2] | 90 | 90 | — |
| Polytrimethylene ether diol Mn 1810 | 23 | — | — |
| Ethylene oxide oligomer[1] | — | 28.8 | 29.2 |
| Dibutyl tin dilaurate (10% solution in xylene) | 0.21 | 0.24 | 0.24 |
| Butyl acetate | 30.5 | 34.8 | 35.7 |
| Xylene | 23.5 | 24.0 | 24.7 |
| Methyl amyl ketone | 30.5 | 34.8 | 35.7 |
| Byk-333 from Byk-Chemie | 0.06 | 0.07 | 0.07 |
| Activator[4] | 34.9 | 53.9 | 54.9 |
| Total | 232.67 | 266.61 | 270.5 |

Hydroxy acrylic polymer[2]-described in Example 1.
Hydroxy acrylic polymer[3]-described in Example 1.
Ethylene oxide oligomer[1]-described in Example 1.
Activator[4]-described in Example 1.

The above prepared Clear Coating Compositions D to F were each applied with a draw-down bar over electrocoated steel panels to give a dry film thickness of 2 mils (51 microns) and the resulting clear coating compositions were cured at an ambient temperature of about 24° C. The Persoz Hardness and the Fischer Hardness were measured for each of the panels at different times and the data is shown in Tables 5 and 6 below. The Tg, % Strain to Break, and Energy to Break were measured for each of the clear coating compositions after curing for 30 days at about 24° C. and 50% relative humidity and the results are shown in Table 7 below.

TABLE 5

Persoz Hardness of Clear Coating Compositions D to F

| Clear Coating | 3 Hours | 1 Day |
|---|---|---|
| D | 10 | 78 |
| E | 17 | 175 |
| F | 4 | 60 |

TABLE 6

Fischer Hardness Clear Coating Compositions D to F

| Clear Coating | 1 day | 7 days | 14 days | 21 days |
|---|---|---|---|---|
| D | 26.2 | 51 | 51 | 57 |
| E | 55 | 145 | 151 | 156 |
| F | 8.6 | 124 | 135 | 136 |

TABLE 7

Tg, % Strain at Break and Energy to Break Clear Coatings D to F

| Clear Coating | Tg | % Strain to Break | Energy to Break (mi/sq.mm) |
|---|---|---|---|
| D | 60.3 | 52.6 | 112.4 |
| E | 63.7 | 7.0 | 32.8 |
| F | 58.0 | 6.6 | 31.2 |

Clear Coating Composition F is a comparative composition that was formulated with a low Tg acrylic polymer (Tg 20° C.). Clear Coating Composition E is a comparative composition that was formulated with a high Tg acrylic polymer (Tg 68° C.). Clear Coating Composition D is a preferred composition of the invention and was also formulated with the same high Tg acrylic polymer. Clear Coating Composition D has acceptable hardness values (Persoz and Fischer) but significantly higher % Strain to Break and Energy to Break which typically translates into a tougher clear coating composition that is more useful on automobiles and trucks in comparison to Clear Coating Compositions E and F. Clear Coating Composition E that used the same high Tg acrylic polymer as Clear Coating Composition D but did not use the polytrimethylene ether diol but rather a ethylene oxide oligomer had high hardness but significantly lower % Strain to Break and Energy to Break in comparison to Clear Coating Composition D which represents the invention. Similarly, Clear Coating Composition F that used the low Tg acrylic polymer and the ethylene oxide oligomer had significantly lower % Strain to Break and Energy to Break in comparison to Clear Coating Composition D which represents the invention.

Example 3

The following clear coating compositions G through K were prepared by charging the following ingredients into a mixing vessel and thoroughly mixing the ingredients:

|  | Clear Coating Compositions | | | | |
|---|---|---|---|---|---|
| Description of Material | G PBW | H PBW | I PBW | J PBW | K PBW |
| Hydroxy acrylic polymer[2] | 58.7 | 58.6 | 58.0 | 50.5 | 68.7 |
| Polytrimethylene ether diol Mn 2753 | 15.1 | — | — | — | — |
| PPG 2000[5] | — | 15.0 | — | — | — |
| Terathane ® 2000[6] | — | — | 14.9 | — | — |
| S Diol[7] | — | — | — | 12.9 | 2.2 |
| Dibutyl tin diacetate (10% solution in xylene) | 0.3 | 0.3 | 0.3 | .03 | .03 |
| Activator[4] | 25.9 | 26.1 | 26.9 | 36.3 | 28.8 |
| Total | 100.0 | 100.0 | 100.0 | 100.0 | 100.0 |

Hydroxy acrylic polymer[2] - described in Example 1.
PPG 2000[5] - Polypropylene glycol having a molecular weight of 2000 from Aldrich Chemical Company (product no. 81380).
Terathane ® 2000[6] polyether glycol having a molecular weight of 2023 from DuPont.
S Diol[7] - hydroxy oligomer (reaction product of 3 moles of caprolactone and 1 mole of 1,4-cyclohexane dimethanol).
Activator[4] - described in Example 1.

The above prepared Clear Coating Compositions G to K were each applied with a draw-down bar on electrocoated steel panels. The clear coating compositions were cured at an ambient temperature of about 24° C. The resulting dry film thickness of each of the clear coating compositions was in the range of 1.8 to 2.2 mils (46 to 56 microns).

The Gel Fraction and Tg of each of the clear films after 30 days curing at about 24° C. and 50% relative humidity were measured and the results shown in Table 8 following.

TABLE 8

Gel Fraction and Tg (Glass Transition Temperature) Clear Coating Films G to K

| Clear Coating | Gel Fraction | Tg |
|---|---|---|
| G | 97.80% | 64.2 |
| H | 89.90% | 61.4 |
| I | 98.10% | 58.5 |
| J | 95.20% | 33.1 |
| K | 94.50% | 59.8 |

The Glass Transition Temperatures (Tg) of the Clear Coating Films G-I and K were very similar. Clear Coating J had a relatively low Tg in comparison to the other Clear Coatings. The relatively large amount of soluble material in Clear Coating Film H indicates that this film should have poorer long term outdoor durability in comparison to Clear Coatings G and I. Clear Coatings J and K have more soluble material than Clear Coatings G and I and are also expected not to have as good long term outdoor durability as Clear Coatings G and I.

Example 4

Preparation of Primer Millbase Compositions L to P

Primer millbase compositions L to P were prepared by charging the following ingredients into a mixing vessel:

| Description of Material | Primer Millbase Compositions | | | | |
|---|---|---|---|---|---|
| | L PBW | M PBW | N PBW | O PBW | P PBW |
| Portion 1 | | | | | |
| Butyl acetate | 130.9 | 130.9 | 130.9 | 130.9 | 127.3 |
| Xylene | 21.3 | 21.3 | 21.3 | 21.3 | 20.7 |
| Methyl amyl ketone | 23.2 | 23.2 | 23.2 | 23.2 | 22.6 |
| Methyl isobutyl ketone | 75.3 | 75.3 | 75.3 | 75.2 | 73.2 |
| Polytrimethylene ether diol Mn 2753 | 75.7 | — | — | — | — |
| PPG 2000(5) described in Ex. 3 | — | 75.7 | — | — | — |
| Terathane ® 2000(6) described in Ex. 3 | — | — | 75.7 | — | — |
| S Diol(7) described in Ex. 3 | — | — | — | 75.7 | 12.3 |
| Hydroxy acrylic polymer(2) described in Ex. 1 | 295.3 | 295.2 | 295.2 | 295.2 | 389.6 |
| BYK-320 dispersion (Polysiloxane resin available from Byk Chemie) | 3.8 | 3.8 | 3.8 | 3.7 | 3.7 |
| Anti-Terra U (salt of a long chain polyamine-amide and high molecular weight ester) | 2.8 | 2.8 | 2.8 | 2.8 | 2.7 |
| Dibutyl tin diacetate (10% solution in xylene) | 1.6 | 1.7 | 1.7 | 1.9 | 1.7 |
| Bentone ®-34 (dispersion of Bentone ® 34 from Elementis Specialties) | 76.6 | 76.6 | 76.6 | 76.6 | 74.5 |
| Portion 2 | | | | | |
| Talc N 503 (talc pigment) | 91.6 | 91.6 | 91.6 | 91.6 | 89.1 |
| Talc D30E (talc pigment) | 134.9 | 134.9 | 134.9 | 134.9 | 131.2 |
| ZEEOS G 200 (hollow glass beads from Eastech Chemical) | 337.4 | 337.4 | 337.4 | 337.4 | 328.1 |
| Portion 3 | | | | | |
| Blanc Fixe (barium sulfate pigment) | 119.9 | 119.9 | 119.9 | 119.8 | 116.6 |
| Titanium dioxide pigment | 106.1 | 106.1 | 106.1 | 106.1 | 103.2 |
| Carbon black pigment | 2.3 | 2.3 | 2.3 | 2.3 | 2.2 |
| Portion 4 | | | | | |
| Acetic acid | 1.3 | 1.3 | 1.3 | 1.3 | 1.3 |
| Total | 1500 | 1500 | 1500 | 1500 | 1500 |

In the preparation of each of the Primer Millbase Compositions L to P, Portion 1 was charged into the mixing vessel and stirred for 15 minutes. Portion 2 was premixed and slowly added to the mixing vessel with stirring and stirred for 30 minutes. Portion 3 was premixed and slowly added to the mixing vessel with stirring and stirred for 60 minutes. Portion 4 was added and stirred for 15 minutes and the resulting mixture was ground 3 passes in a top feed sand mill using glass media for 3 passes. Since Primer Millbase Compositions M to P do not contain polytrimethylene ether diol, they are considered to be comparative compositions.

The resulting Primer Millbases L to P have the following properties:

| | Primer Millbase | | | | |
|---|---|---|---|---|---|
| | L | M | N | O | P |
| Weight % solids | 69.9 | 69.9 | 69.9 | 69.9 | 67.8 |
| Volume % solids | 49.1 | 49.1 | 52.7 | 48.9 | 46.3 |
| Pigment/Binder ratio | 318.5/100 | 318.5/100 | 318.5/100 | 318.5/100 | 321.7/100 |
| Pigment Vol. Concentration (%) | 54.61 | 54.47 | 47.2 | 55.01 | 55.58 |
| Gallon Weight (#/gal) | 12.13 | 12.12 | 11.26 | 12.17 | 11.98 |

Activated Primer Compositions L to P were prepared by blending the following ingredients together shortly before spray application:

|  | Activated Primer Comp. | | | | |
| --- | --- | --- | --- | --- | --- |
|  | L | M | N | O | P |
| Primer Mill Base | 250 | 249.8 | 249.1 | 239.1 | 245.4 |
| Reducer[3] | 28.3 | 28.3 | 28.2 | 27.1 | 27.8 |
| Activator[4] | 21.7 | 21.9 | 22.7 | 33.8 | 26.8 |
| Total | 300.0 | 300.0 | 300.0 | 300.0 | 300.0 |

Reducer[3] - described in Example 1.
Activator[4] - described in Example 1

The resulting Activated Primer Compositions L to P have the following properties:

|  | Activated Primer Composition | | | | |
| --- | --- | --- | --- | --- | --- |
|  | L | M | N | O | P |
| NCO:OH ratio | 1.12:1.0 | 1.12:1.0 | 1.12:1.0 | 1.12:1.0 | 1.12:1.0 |
| Weight % solids | 62.6 | 62.6 | 62.6 | 62.7 | 61.0 |
| Volume % solids | 42.6 | 42.7 | 45.8 | 43.3 | 41.0 |
| Gallon Weight (#/gal) | 11.0 | 11.1 | 10.4 | 10.9 | 10.9 |
| VOC* (calculated #/gal) | 4.1 | 4.09 | 3.9 | 4.06 | 4.04 |

VOC volatile organic content.

The above prepared Activated Primer Compositions L to P were each applied by spraying onto separate cold rolled steel panels coated with about 0.3 to 0.6 mils (7.5 to 15 microns) of a commercial refinish wash primer (described in Example 1) and the Activated Primer Composition was cured at ambient temperature. The resulting dry film thickness of the primer composition was in the range of 4 to 7 mils (100 to 178 microns). The Persoz Hardness and the Fischer Hardness were measured for each of the panels and shown in Tables 9 and 10 below.

TABLE 9

Persoz Hardness of Activated Primer Compositions L to P

| Primer | 3 Hours | 1 Day |
| --- | --- | --- |
| L | 34 | 86 |
| M | 39 | 93 |
| N | 41 | 85 |
| O | 35 | 46 |
| P | 30 | 61 |

TABLE 10

Fischer Hardness of Activated Primer Compositions L to P

| Primer | 1 day | 7 days |
| --- | --- | --- |
| L | 74 | 105 |
| M | 100 | 117 |
| N | 68 | 123 |
| O | 30.4 | 61 |
| P | 47 | 157 |

The above data in Table 9 shows that Primer Compositions L to P have about the same Persoz Hardness after 3 hours but after one day Primers L to N have a significant higher level of hardness in comparison to Primers O and P that contained S Diol and did not contain the polytrimethylene ether diol. The above data in Table 10 shows that Primer Compositions L to N have relatively high Fischer Hardness values after 1 day in comparison to Primer Compositions O and P that contained S Diol and did not contain the polytrimethylene ether diol. After 7 days, Primer Composition O that contained S Diol had significantly lower hardness value comparison to the Primer Compositions L, M, N. and P. The higher Fischer Hardness of sample P is because there is much less of the low molecular weight S Diol than in sample O.

A set of panels primed with Primer Compositions L to P was prepared as above. The panels were allowed to cure overnight at about 24° C. and 50% relative humidity and were then sanded with 400 grit sandpaper and the resulting film build was about 4.0 to 4.5 mils (102 to 114 microns). Each of the panels was coated with an un-activated red metallic base coat (described in Example 1). Each panel was top coated with a clear top coat (DuPont ChromaClear® V-7500S described in Example 1) and cured.

Each of the above prepared panels was tested for chip resistance using the Gravelometer test as described above. The results are shown in Table 11 below.

TABLE 11

| | Gravelometer Test Results | | |
| --- | --- | --- | --- |
| Gravelometer Test | 3 Pints Stones Room Temp. | 1 Pint Stones Frozen | Size of Largest Chip |
| Red Metallic Base Coat | | | |
| Primer L | 5 | 6 | 7.5 sq. mm |
| Primer M | 5 | 6 | 10 sq. mm |
| Primer N | 5 | 6 | 15 sq. mm |
| Primer O | 2 | 2 | Not rated |
| Primer P | 2 | 2 | Not rated |

Primer L, the invention, Primer M and Primer N have similar Gravelometer Chip ratings whereas Primers O and P have very low and unacceptable Gravelometer Chip ratings. The size of the largest chip is also a consideration. Primer L, the invention, has the smallest size chips and is considered to have the best performance in comparison to Primers M and N that had noticeably larger chip sizes. Primers O and P were not rated for chip size since the Gravelometer Chip ratings were poor.

Example 5

Preparation of (Polytrimethylene Ether Diols A and B)

1,3-Propanediol (3.4 kg) and concentrated sulfuric acid (30.4 g) were placed in a 5 L three neck round bottom flask fitted with a nitrogen inlet, mechanical stirrer and a distillation head. Nitrogen gas was bubbled through the reaction mixture for 15 minutes. The polymerization was carried out at 160° C. with stirring under a nitrogen atmosphere. After collecting 525 g of water distillate in a receiving flask, the flask was connected to a vacuum pump and the pressure was slowly reduced to 1–5 mm Hg. The molecular weight of the resulting reaction product was monitored by analyzing the samples at different time intervals using an NMR end group analysis method. The polymerization was stopped after obtaining the desired molecular weight (approximately 2,000) and the polymer was purified as described below.

An equal volume of water was added to the crude polymer and the reaction mixture was refluxed at 100° C. for about 6 hours and a stirring speed of 180 rpm was used under a nitrogen atmosphere. After approximately 6 hours, the heater and the stirrer were turned off and the mixture was allowed to separate into two phases. The top aqueous phase was decanted and the polytrimethylene ether diol phase was washed further with distilled water three more times to extract out most of the acid and the oligomers that were formed. The residual acid left in the polytrimethylene ether diol was neutralized with excess lime. The polytrimethylene ether diol was dried at about 100° C. under reduced pressure for 2–3 hours and then the dried diol was filtered while hot through a Whatman filter paper pre-coated with a Celite® filter aid. The polytrimethylene ether diol had an equivalent weight of 1138, a number average molecular weight (Mn) of 2276 and a hydroxyl no. of 49.3.

Preparation of Concentrate

The following constituents were blended together to form a concentrate:

|  | (wt. %) |
|---|---|
| Tinuvin ® 384-2[1] | 3.834 |
| Tinuvin ® 292[2] | 3.640 |
| Byk 333 from Byk Chemie[3] | 0.364 |
| Byk 358 N from Byk Chemie | 2.913 |
| 2 wt % Fascat ® 4202 from Atofina Chemicals, Inc. in ethyl acetate | 10.923 |
| 10 wt % acetic acid in methyl amyl ketone | 14.017 |
| 10 wt % N,N-dimethyldodecyl amine in methyl amyl ketone. | 15.840 |
| Reducer[4] | 48.470 |
| Total | 100.00 |

[1]Tinuvin ® 384-2 solution 25% solution in butyl acetate of a substituted benzotriazole derivative from Ciba Specialty Chemicals Corp., Additives Division.
[2]Tinuvin ® 292 - 25% solution in butyl acetate of bis(1,2,2,6,6-pentamethyl-4-piperidinyl sebacate) available from Ciba Geigy Specialties Chemicals, Basel, Switerland.
[3]Byk 333 - 1% solution in butyl acetate of a polyether modified dimethyl polysiloxane from Byk Chemie.
[4]Reducer - 12375S - blend of oxygenated hydrocarbon solvents commercially available from DuPont.

Preparation of Clear Coat Compositions 1–4

Clear Coat Composition 1–4 were prepared by blending together the following ingredients:

| | Clear Coat Compositions | | | |
|---|---|---|---|---|
| Description of Material | 1 PBW | 2 PBW | 3 PBW | 4 PBW |
| Concentrate (prepared above) | 78.561 | 78.284 | 78.062 | 78.492 |
| Polytrimethylene ether diol (prepared above) | 0.0 | 0.0 | 26.338 | 26.180 |
| Acrylic Polymer Solution 1 | 95.833 | 94.226 | 101.98 | 101.369 |
| Acrylic Polymer Solution 2 | 94.564 | 92.987 | 100.629 | 100.026 |
| Acrylic Polymer Solution 3 | 82.911 | 81.521 | 88.229 | 87.701 |
| Ethylene Oxide Oligomer described in Ex. 1 | 30.938 | 30.419 | 0 | 0 |
| Reducer (described above) | 157.00 | 123.00 | 155.00 | 126.00 |
| Total | 540.00 | 500.01 | 549.99 | 520.01 |

Acrylic Polymer Solution 1—59.6% wt. solids in 15/85 methyl ethyl ketone/xylene having a Gardner-Holdt Viscosity of Z–Z2+½ of an acrylic polymer of 15 parts styrene, 20 parts methyl methacrylate, 45 parts isobutyl methacrylate, 20 parts hydroxy ethyl methacrylate having a Mw of 11,000 and a Tg of 69.3° C. (calculated).

Acrylic Polymer Solution 2—60.4% wt. solids in 15.4/84.6 methyl ethyl ketone/xylene having a Gardner-Holdt Viscosity of U+½–X of an acrylic polymer of 15 parts styrene, 20 parts hydroxy ethyl methacrylate, 23 parts isobornyl methacrylate, 5 parts methyl methacrylate, 5 parts of 2-ethylhexyl methacrylate and 32 parts isobutyl methacrylate having a Mw of 8,000 and a Tg of 79° C. (calculated).

Acrylic Polymer Solution 3—62.0% wt. solids in 89.47/10.53 xylene/butyl acetate having a Gardner-Holdt Viscosity of V–X+½ of an acrylic polymer of 20 parts styrene, 30 parts isobornyl methacrylate, 17.5 parts 2-ethylhexyl methacrylate, 16.25 parts hydroxy ethyl methacrylate and 16.25 parts hydroxy propyl methacrylate having a Mw of 5,000 and a Tg of 78.2° C. (calculated).

Clear Coating Compositions 1 and 2 are comparative compositions and Clear Coating Compositions 3 and 4 containing the polytrimethylene ether diol are the novel compositions of this invention.

The following four activated clear coating compositions were prepared utilizing the above prepared clear coating compositions and by blending the following constituents together:

| | Comparative Clear 1 | Comparative Clear 2 | Novel Clear 3 | Novel Clear 4 |
|---|---|---|---|---|
| Clear Coating Composition (prepared above) | 283.63 | 267.10 | 271.47 | 258.21 |
| Desmodur ® N-3300A[1] | 50.24 | | 40.29 | |
| Activator[2] | | 71.27 | | 57.15 |
| Total | 333.87 | 338.37 | 311.76 | 315.36 |

[1]Desmodur ® N-3300A - trimer of hexamethylene diisocyanate from Bayer Corporation.
[2]Activator - 4507S aliphatic polyisocyanate activator from DuPont.

Each of the above activated clear coating compositions was adjusted to a 45% solids content and the activation ratio for each composition was 1.3:1 NCO:OH. Each of the coating compositions was sprayed onto a primed steel panel under ambient temperature conditions and subjected to the following test: Waterspot, Persoz Hardness, and Fischer Hardness under the times as shown in the following Table 1. Also, the Zahn Viscosity of each of the coating compositions was measured initially, after 60 and 90 minutes and these results are shown in Table 1.

TABLE 1

| | Comparative Clear 1 | Comparative Clear 2 | Novel Coating 3 | Novel Coating 4 |
|---|---|---|---|---|
| Waterspot 60 min. | 7.5 | 7.5 | 7.5 | 7.5 |
| Waterspot 120 min. | 9.5 | 9 | 9.9 | 9.5 |
| Zahn #1 initial | 15.28 | 15.41 | 15.95 | 15.87 |
| Zahn #1 60 min. | 17.8 | 18.09 | 18.72 | 18.31 |
| Zahn #1 90 min. | 19.48 | 19.51 | 19.97 | 19.48 |
| Film build (mils/microns) | 2.5/63.5 | 2.2/55.88 | 2.2/55.88 | 2.2/55.88 |
| Persoz 2 hrs | 22 | 23 | 27 | 25 |
| Persoz 4 hrs | 38 | 40 | 44 | 44 |

TABLE 1-continued

|  | Comparative Clear 1 | Comparative Clear 2 | Novel Coating 3 | Novel Coating 4 |
|---|---|---|---|---|
| Persoz 24 hrs | 131 | 152 | 131 | 150 |
| Fischer 1 day | 36.5 | 48 | 41.7 | 46.9 |
| Fischer 7 days | 82 | 101 | 80 | 88 |
| Fischer Baked 285° F. × 30' | 159 | 165 | 108 | 119 |
| Baked - 7 Day Fischer | 77 | 64 | 28 | 31 |

The above results show that polytrimethylene ether diol can be used in place of ethylene oxide oligomer and can improve the water spot resistance slightly and allow the appearance to be maintained days after spraying. The ability to maintain appearance is indicated by the smaller difference between the Baked Fischer hardness and the 7 Day Fischer Hardness. Novel coatings 3 and 4, containing polytrimethylene ether diol, are closer to their final state after 7 days than the Comparative clears 1 and 2, which may be due to faster solvent release. Therefore, Novel Coatings 3 and 4 maintain appearance better. Also, this is achieved without sacrificing Persoz Hardness or the early Fischer Hardness and does not adversely impact the ability to sand or buff the Novel Coatings 3 and 4 and the handling of parts that have been coated with these Novel Coatings.

Example 6

The following clear coating compositions A–D were formulated by blending the constituents shown in the following Table 2:

TABLE 2

|  | Clear A | Clear B | Clear C | Clear D |
|---|---|---|---|---|
| Acrylic Polymer 4 | 247.1 | 370.6 | 357.2 | 343.8 |
| Butyl acetate | 18.6 | 27.9 | 27.9 | 27.9 |
| Methyl ethyl ketone | 17.3 | 25.9 | 26.7 | 27.5 |
| Xylene | 38.3 | 57.4 | 62.0 | 66.6 |
| Toluene | 9.5 | 14.3 | 14.3 | 14.3 |
| Methyl isobutyl ketone | 32.8 | 48.9 | 48.9 | 48.9 |
| S Diol[7] (described in Ex. 3) | 5.4 | 0 | 0 | 0 |
| Polytrimethylene ether diol (prepared in Example 5) | 0 | 8.1 | 16.1 | 24.2 |
| Acetone | 7.9 | 11.8 | 11.8 | 11.8 |
| Oxzol | 13.4 | 20.1 | 20.1 | 20.1 |
| Tinuvin ® 292 (described in Example 1) | 3.01 | 4.51 | 4.51 | 4.51 |
| Tinuvin ® 384-2 (described in Example 1) | 3.17 | 4.75 | 4.75 | 4.75 |
| BYK325 (from Byk-Chemie) | 0.38 | 0.58 | 0.58 | 0.58 |
| 10% BYK333 (described in Example 1) | 0.54 | 0.82 | 0.82 | 0.82 |
| Modaflow 2100 from Eastech Chemical | 0.46 | 0.68 | 0.68 | 0.68 |
| 2 wt % Fascat ® 4202 from Atofina Chemicals, Inc. in ethyl acetate | 1.93 | 2.9 | 2.9 | 2.9 |
| Acetic acid | 0.53 | 0.79 | 0.79 | 0.79 |
| Total | 400 | 600 | 600 | 600 |

Acrylic Polymer 4—60 wt. % solids in a solution of 85/15 xylene/methyl ethyl ketone solvent blend having a Gardner-Holdt Viscosity of S-V of an acrylic polymer of styrene/methyl methacrylate/isobornyl methacrylate/2-ethylhexyl methacrylate/isobutyl methacrylate/hydroxy ethyl methacrylate in a ratio of 15/2/15/23/20/25 having a Mw of approximately 6,500 and a calculated Tg of 55° C.

Activated clear coating composition were prepared using the using the clear compositions A-D prepared above. In Table 3 below, Act. A-1 was prepared with the above Clear Coating Composition A. Act. B-1 and Act. B-2 were prepared with Clear Coating Composition B. Act. C-1 and Act. C-2 were prepared with Clear Coating Composition C. Act. D-1 and Act. D-2 were prepared with Clear Coating Composition D. In compositions Act. A-1, Act. B-1, Act.C-1, Act.D-1, the amount of activator used was a constant amount and therefore the activation ratio varied. In compositions Act B-2, Act. C-2, and Act. D-2, the ratio was a constant 1.08:1 NCO:OH. Act. A-1 is a lab made control. V-7500S (described in Example 1).

TABLE 3

|  | Act. A-1 | Act. B-1 | Act. B-2 | Act. C-1 | Act. C-2 | Act. D-1 | Act.D-2 | V7500S |
|---|---|---|---|---|---|---|---|---|
| Clear | 157.18 | 157.18 | 159.13 | 157.18 | 159.78 | 157.18 | 160.4 | 157.18 |
| V7575S | 42.82 | 42.82 | 40.87 | 42.82 | 40.24 | 42.82 | 39.6 | 42.82 |
| Total | 200 | 200 | 200 | 200 | 200 | 200 | 200 | 200 |

VS7575S - Aliphatic polyisocyanate activator from DuPont.

Each of the above activated clear coating compositions was adjusted to a 45% solids content and each of the coating compositions was sprayed onto a primed steel panel under ambient temperature conditions and subjected to the following test: Waterspot, Persoz Hardness, and Fischer Hardness under the times as shown in the following Table 4

TABLE 4

|  | Act. A-1 | Act. B-1 | Act. B-2 | Act. C-1 | Act. C-2 | Act. D-1 | Act. D-2 | V7500S |
|---|---|---|---|---|---|---|---|---|
| Film build (mils/microns) | 2.7/ 68.6 | 2.5/ 63.5 | 2.5/ 63.5 | 2.2/ 55.6 | 2.3/ 58.4 | 2.3/ 58.4 | 2.4/ 61 | 2.6/ 66 |
| Persoz 4 hrs | 40 | 61 | 62 | 69 | 72 | 59 | 57 | 36 |
| Persoz 1 Day | 128 | 101 | 115 | 130 | 139 | 131 | 111 | 98 |
| Fischer 1 Day | 49 | 46.5 | 52.6 | 55.4 | 62 | 56.4 | 50.2 | 34.6 |
| Fischer 7 Day | 78 | 90 | 92 | 98 | 92 | 87 | 82 | 76 |
| Fischer Baked 285° F. (141° C.) × 30' | 131 | 125 | 126 | 109 | 115 | 116 | 102 | 130 |

TABLE 4-continued

|  | Act. A-1 | Act. B-1 | Act. B-2 | Act. C-1 | Act. C-2 | Act. D-1 | Act. D-2 | V7500S |
|---|---|---|---|---|---|---|---|---|
| Baked Fischer - 7 Day Fischer | 53 | 35 | 34 | 11 | 23 | 29 | 20 | 54 |
| Water Spot 1 hr | 2 | 2 | 2 | 2 | 2 | 2 | 2 | 2 |
| Water Spot 2 hrs | 6 | 6 | 6 | 5 | 7 | 7 | 8 | 6 |
| Water Spot 3 hrs | 7 | 7 | 7 | 7 | 7 | 7 | 8 | 7 |

The above results show that the Persoz Hardness can be maintained or possibly increased at short times by using polytrimethylene ether diol in place of the hydroxy ester oligomer. The 4 hour Persoz Hardness is higher for all the novel compositions than for the 2 controls, Act A-1 and V7500S. Water Spot at 2 hours is as good as or better for the experimental samples than the controls. Several are better than the controls. The water spot for all of the compositions were very similar by 3 hours and there was no difference at 2 hours. There is a much smaller difference between the baked Fischer Hardness and the 7 day Fischer Hardness for the compositions of the invention Act. B-1 to Act. D-2 in comparison to the controls Act. A-1 and 7500S even when the invention compositions had quite low levels of polytrimethylene ether diol. Based on the above results, it is believed that the use of polytrimethylene ether diol in clear coating compositions will allow good appearance to be maintained and may improve productivity of these clear coats in comparison to low Tg hydroxy functional oligomers. To obtain improved weatherability, additional stabilizers and/or anti-oxidants would be added to the compositions.

What is claimed is:

1. A clear coating composition comprising a film forming binder consisting essentially of
   a. 60 to 75% by weight, based on the weight of the binder, of the acrylic polymer;
   b. 2.5 to 9.5% by weight, based on the weight of the binder of polytrimethylene ether diol having a Mn (number average molecular weight) of 500 to 5,000; and
   c. 22 to 31% by weight, based on the weight of the binder, of an organic polyisocyanate crosslinking agent and wherein the sum of the percentages of a., b. and c. is 100%.

2. The coating composition of claim 1 wherein the polytrimethylene ether diol is formed via a bio conversion process.

3. The coating composition of claim 1 wherein the acrylic polymer consists essentially of polymerized monomers selected from the group consisting of alkyl (meth)acrylates having 1 to 12 carbon atoms in the alkyl group, isobornyl methacrylate styrene, alpha methyl styrene, (meth)acrylonitrile, (meth)acryl amides, and polymerized monomers consisting of hydroxy alkyl (meth)acrylates having 1 to 4 carbon atoms in the alkyl group.

4. The coating composition of claim 3 wherein the acrylic polymer consists essentially of styrene, ethylhexyl methacrylate, isobornyl methacrylate and hydroxyethyl methacrylate.

5. The coating composition of claim 1 wherein the polyisocyanate is selected from the group consisting of aliphatic polyisocyanates, cycloaliphatic polyisocyanates, aromatic polyisocyanates, trifunctional isocyanates and isocyanate adducts.

6. The coating composition of claim 1 containing 0.1 to 10% by weight, based on the weight of the binder, of ultraviolet light (UV) stabilizers from the group of UV absorbers, UV screeners, UV quenchers, hindered amine light stabilizers and optionally, 0.1 to 5% by weight, based on the weight of the binder, of antioxidants.

7. A coated substrate which comprises a substrate coated with a layer of the coating composition of claim 1.

8. The coated substrate of claim 7 wherein the substrate is selected from the group of steel, aluminum, reinforced plastic and plastic.

9. A two component coating composition comprising
   Component A an acrylic polymer having pendant groups that are reactive with isocyanate moieties and having a glass transition temperature (Tg) of 10 to 80° C.; and a polytrimethylene ether diol having a Mn (number average molecular weight) of 500 to 5,000; and
   Component B an organic polyisocyanate crosslinking agent;
   wherein Components A and B are thoroughly mixed together before application to a substrate.

10. A process for refinishing a damaged coating on a motor vehicle body which comprises applying a layer of the pigmented coating composition to damaged coating and at least partially curing the layer and then applying a second layer of a pigmented base coat and a layer of a clear coat of the composition of claim 1 and curing all of the layers to form a finish.

* * * * *